March 9, 1965 H. E. SCHWARTZ 3,172,938
SHAPE CUTTING MACHINE
Filed Feb. 28, 1963 2 Sheets-Sheet 2
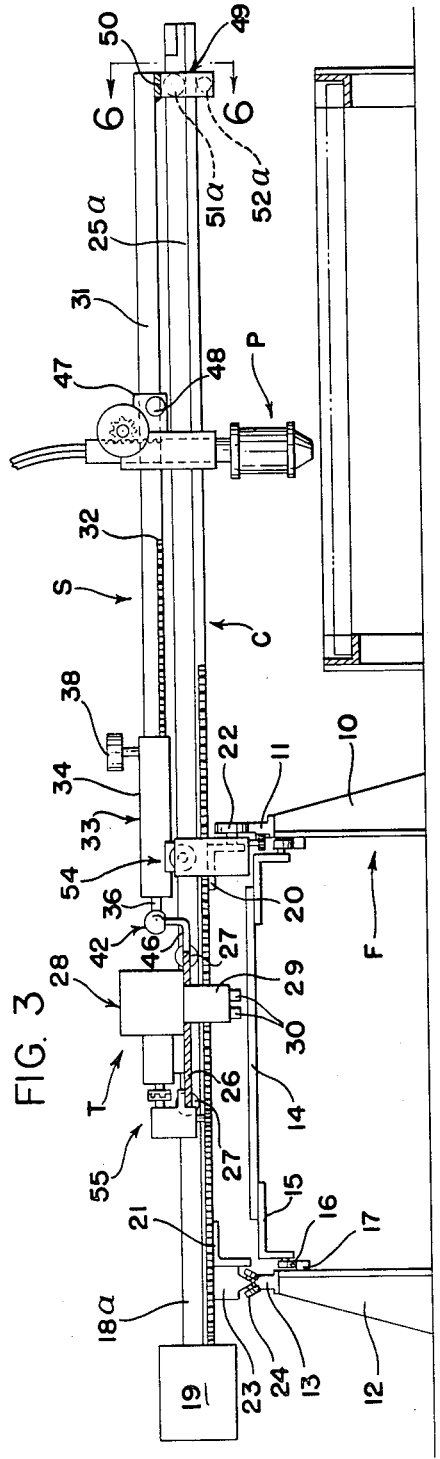
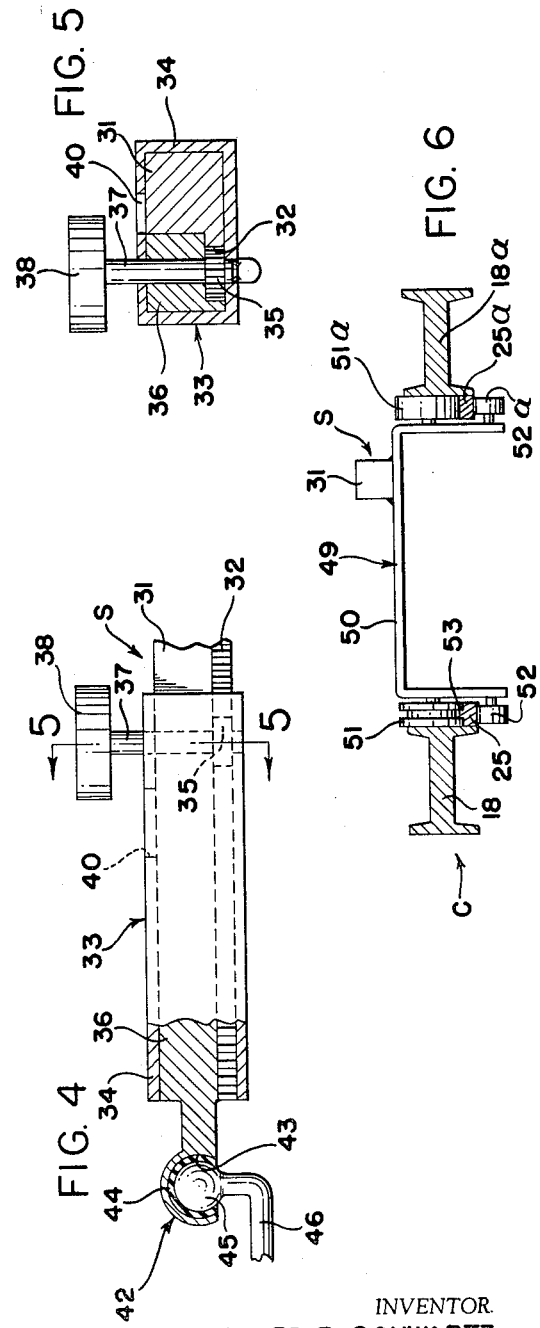
INVENTOR.
HOWARD E. SCHWARTZ
BY
Howard L. Weinshenker
ATTORNEY

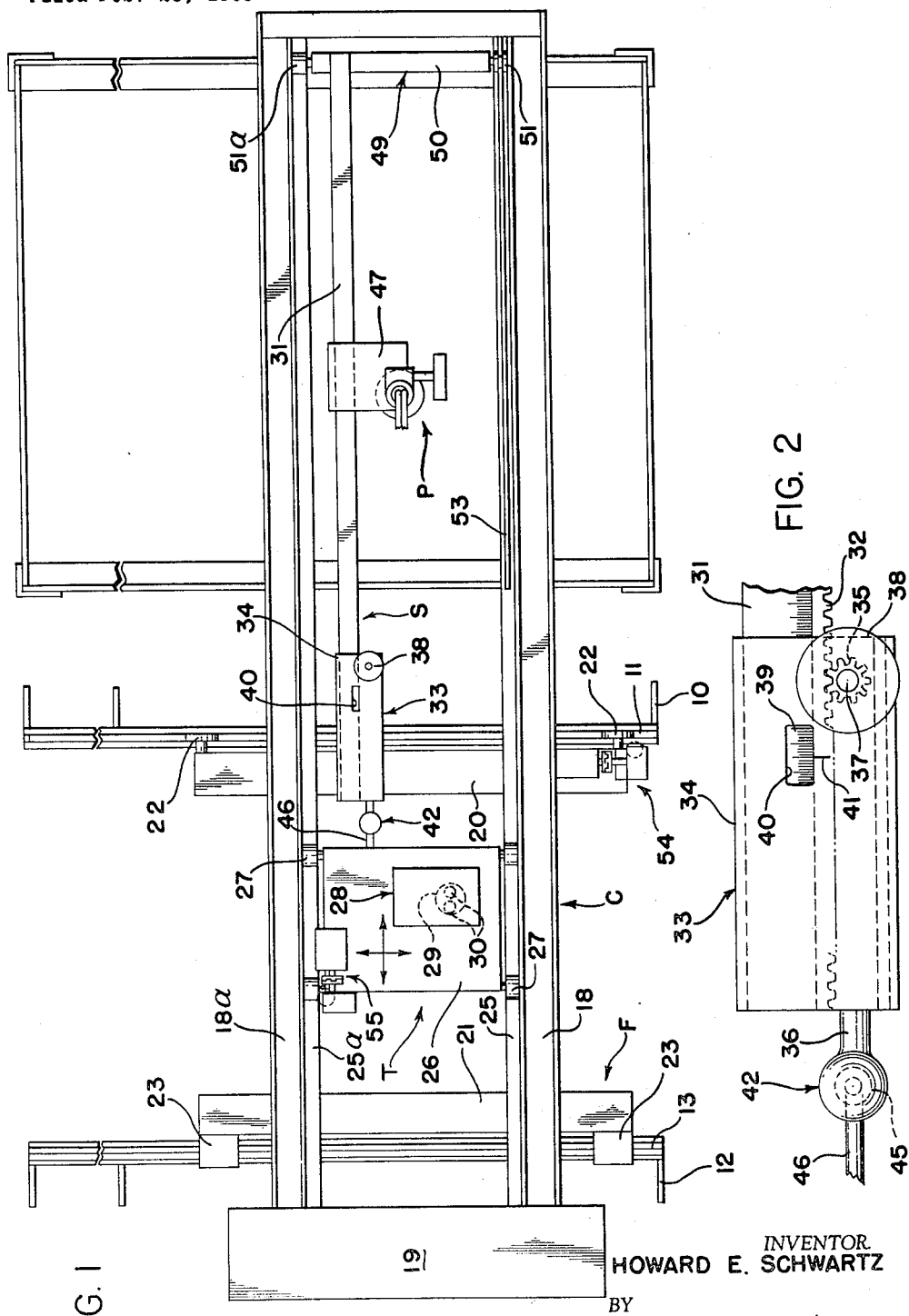

3,172,938
SHAPE CUTTING MACHINE

Howard E. Schwartz, Medina, Ohio, assignor, by mesne assignments, to Jetcut Corporation, Bedford, Ohio, a corporation of Ohio
Filed Feb. 28, 1963, Ser. No. 261,584
6 Claims. (Cl. 266—23)

This invention relates to shape cutting machines and more particularly to contour reproducing torch cutting machines.

The invention provides in brief, a shape cutting machine comprising a main carriage, a tracer unit mounted for movement along the main carriage, a cutting tool support means having one end connected to the tracer unit through a universal joint, and having its other end supported for movement of the cutting tool support means along the main carriage, and at least one cutting tool mounted intermediate the ends of the cutting tool support means.

The invention also provides novel means for adjusting the cutting tool support means, whereby it is possible to position the cutting tool with respect to the work to be cut, with greater precision and within closer tolerances than hithertofore possible.

Most prior art contour reproducing cutting machines have been designed specifically for use with oxygen cutting torches. These machines are limited in their speed of operation to the cutting speed of an oxygen torch, which is generally within the range of about 10 to about 45 inches per minute.

More recently, plasma jet and laser torches have been developed which are capable of cutting metal stocks at speeds of up to 400 inches per minute, and even more, depending on the thickness and composition of the metal stock. Unfortunately, metals fabricators have been unable to take full advantage of the very high cutting speeds of these relatively new torches for the simple reason that commercially available machines, designed to manipulate low speed oxygen torches, are not capable of guiding a high speed torch with anything approaching an acceptable degree of accuracy.

This has been confirmed by attempting to operate at speeds of 200-400 inches per minute, a machine designed to operate at 10-45 inches per minute. The results was that the cutting tool on the machine vibrated at such a high amplitude and frequency that it was obvious that a satisfactory cutting could not be made. While the exact origins of these vibrtaions are not known with certainty, it is belived that they are generated at least in part by the frictional engagement of a driven templet follower with a templet, the presence of bits of dross, slag or chips of metal on the main carriage rails which carry the tracer unit, and by vibration sources external of the machine. As the machine speed was reduced, so was the magnitude of the vibrations. At conventional oxygen torch cutting speeds, vibrations were still present, but their level was sufficiently low so that the error they introduced was not inordinate, considering that the art has come to expect only a fair degree of accuracy from machines of this type.

In setting out to overcome this deficiency in the prior art machines, it was considered essential that a contour reproducing cutting machine for plasma jet and laser torches attain a higher degree of accuracy at all operating speeds, than has heretofore been realized with machines designed for oxygen torches. This criterion is important for a number of reasons. Firstly, plasma jet and laser torches are capable of cutting a wider range of metals, including comparatively expensive alloys, where the cost of wastage due to inaccurate cuttings cannot be considered lightly. Secondly, if inaccuracies crop up during a high speed cutting operation, a very substantial amount of stock could be ruined before the error is detected and corrected. Thirdly, and this applies to oxygen cutting as well, greater cutting accuracy allows cutting at closer tolerances, and this not only saves stock but reduces and sometimes eliminates the need for post-cutting grinding and machining operations.

The machine provided by the present invention is capable of outstanding cutting accuracy over an entire range of operating speeds, up to and including the 200-400 inch per minute range. This has been accomplished in part by providing a universal joint connection between the tracer unit and the cutting tool support means. For purposes of this disclosure "universal joint" is intended to have the dictionary definition "in mechanics, an arrangement by which one part of a machine may be made to move freely in all directions in relation to another. A famliar example is afforded by the well-known ball-and-socket joint, which consists of a solid working into a hollow sphere." (Webster's New Twentieth Century Dictionary, unabridged; 1956.)

It has been found a universal joint connection between the tracer unit and the cutting tool support means functions to dampen and absorb vibrations which would otherwise be transmitted along the main frame, the main carriage, and through the tracer unit to the cutting tool support means and ultimately to the cutting tool itself. This dampening of vibrations has a marked effect on improving the accuracy of the machine.

To this same end, the machine of the present invention provides the cutting tool support means at its ends with a stable 3-point suspension system in which one suspension point is located a considerable distance from the two remaining suspension points, with the cutting tool rigidly secured to the support means at a position intermediate the distant suspension points. This construction functions to further reduce the effect of vibration on the cutting tool, and consequently contributes to an increase in the cutting accuracy of the machine.

Because the machine of the present invention is capable of faithfully reproducing the contours of a templet, it is possible to cut a work piece within very close tolerances of the final dimensions desired. This not only saves material, but reduces and sometimes eliminates the need for post-cutting grinding and machining operations.

In order to facilitate close tolerance cutting, the machine provides a rack and gear calibrating arrangement for finely adjusting the position of the cutting tool support means and its associated cutting tool, with respect to the work piece.

It is therefore an object of the present invention to provide a contour reproducing cutting machine of improved design which is capable of a high degree of cutting accuracy over an entire range of operating speeds, including the range of 200-400 inches per minute.

It is a further object of the present invention to provide a contour reproducing cutting machine capable of cutting work pieces within very close tolerances of final dimensions.

Other objects and advantages will be apparent from the following detailed description of the invention and from an inspection of the accompanying drawings, in which:

FIG. 1 is a top plan view of the contour reproducing cutting machine;

FIG. 2 is a detailed top view of the torch holding bar adjusting means;

FIG. 3 is a longitudinal section of the contour reproducing cutting machine;

FIG. 4 is a view, partly in side elevation and partly in section, showing torch holding bar adjusting means;

FIG. 5 is a section taken on line 5—5 of FIG. 4; and

FIG. 6 is a section taken on line 6—6 of FIG. 3.

Referring to the drawings and especially FIGS. 1 and 3 the cutting machine comprises a main frame F, a main carriage C, a tracer unit T, cutting tool support means S, and a cutting tool, in this case, a plasma jet cutting torch P.

Main frame F comprises a forward member 10 having an upstanding rail 11 secured thereto, and a rearward member 12 having a double-faced rail 13 secured thereto. Interposing these members is a templet table 14 (FIG. 3) to which is normally secured a templet (not shown). The table rests on brackets 15 to which are secured rollers 16 which rollers ride on braces 17 attached to the inside faces of main frame members 10 and 12.

Main carriage C comprises a pair of elongated parallel beams 18 and 18a having one end embedded in counter weight 19. Interconnecting the beams are front truck 20 and rear truck 21. Front truck 20 carries rollers 22 which are adapted to move along upstanding rail 11. Rear truck 21 has attached thereto a pair of roller blocks 23 which carry pairs of rollers 24, which pairs of rollers are adapted to move along double faced rail 13. Beams 18 and 18a are provided with tracks or rails 25 and 25a respectively, the function of which will be described more fully hereinafter.

Tracer unit T comprises a base plate 26 to which are attached rollers 27 which are adapted to ride in tracks 25 and 25a on main carriage beams 18 and 18a. Mounted on base plate 26 is a tracer drive train designated generally as 28. Depending from the drive train is a tracer follower assembly 29, which terminates in a pair of driven stub shafts 30. These stub shafts which are driven in opposite directions are adapted to frictionally engage the upstanding edges of a stationary templet (not shown), and in this manner, to follow the various contours of the templet.

Cutting tool support means S comprise an elongated, rigid torch holding bar 31, having a near end positioned adjacent tracer unit T, and a distal end located in the vicinity of the free end of main carriage beams 18 and 18a. The torch holding bar 31 has a rack 32 extending from its near end along a portion of the bar's length.

The cutting tool support means S additionally comprises a torch holding bar adjusting means generally designated as 33, and as best seen in FIGS. 2, 4, and 5 this last mentioned means includes a housing 34 embracing the near end of torch holding bar 31; a gear 35 disposed within said housing enmeshing rack 32 on torch holding bar 31; and a gear retaining block 36 mounted integrally within housing 34. Retaining block 36, and the housing thereabove, are provided with a drilled passage which is adapted to receive shaft 37 which is secured at its lower end to gear 35. The upper end of shaft 37 is capped with hand wheel 38 which facilitates the turning of shaft 37 and gear 35.

Since housing 34, gear 35, retaining block 36, shaft 37 and hand wheel 38 are all held in a fixed position with respect to main carriage C, when the machine is at rest, it will be understood that the turning of hand wheel 38, with its associated shaft 37 and gear 35, causes rack 32 and torch holding bar 31 to move longitudinally with respect to main carriage C. With a cutting torch P mounted at a fixed position on torch holding bar 31, it is possible by the manipulation just described to pin-point with great precision the location of the torch with respect to the work piece to be cut.

In order to permit an actual calibrated adjustment of torch holding bar 31, the near end of the bar is provided with a scale 39 (FIG. 2) extending along a portion of the bar's length, and housing 34 is provided with a window 40 positioned so as to expose a portion of scale 39 therethrough. The housing is also provided with a guide line 41 adjacent window 40. As will be readily understood, these features allow for the fine adjustment of torch holding bar 31 to within a fraction of a scale unit.

A universal joint, designated generally as 42 provides the connecting link between tracer unit T and cutting tool support means S. In the embodiment shown in the drawings the universal joint takes the form of a ball and socket assembly. As best seen in FIG. 4 gear retaining block 36 is provided with a lateral extension which terminates in a hollow, spherical socket 43. This socket is lined with a boot 44 made from a resilient shock absorbing material such as rubber. Completing the assembly is spherical ball element 45 with its L-shaped support 46 extending therefrom to a fixed connection with base plate 26 of tracer unit T. This universal joint functions to dampen and absorb vibrations which would otherwise be transmitted along the main frame, the main carriage, and through the tracer unit to the cutting tool support means and ultimately to the cutting tool itself. The presence of a boot of resilient material interposed between the ball and socket elements of the joint, assists in absorbing and dissipating vibrations, and therefore its use is preferred but not considered to be essential.

The cutting torch P is mounted to torch support bar 31 by means of bracket 47 and thumb screw 48. Gross adjustments of the torch along the length of bar 31 can be accomplished by loosening thumb screw 48 and sliding the torch and bracket 47 along the bar. When the approximate positioning has been accomplished, the thumb screw is tightened to secure the bracket and torch in place on the bar. At this point a fine adjustment can be made by manipulating torch holding bar adjusting means 33 in the manner described fully hereinabove. It will be understood that the machine may also be operated with a plurality of torches mounted in tandem along the length of torch support bar 31.

As best seen in FIGS. 1 and 6 torch support bar 31 has secured to its distal end, a rolling support assembly designated generally as 49. This last mentioned support assembly comprises a U-shaped bracket 50, a pair of upper rollers 51 and 51a and a pair of lower rollers 52 and 52a mounted for rotation on the parallel sides of U-shaped bracket 50. Upper and lower rollers 51 and 52, as well as upper and lower rollers 51a and 52a are so positioned as to hug the upper and lower surfaces of main carriage rails 25 and 25a respectively.

It will be noted from FIGS. 1 and 6 that a portion of the upper surface of main carriage rail 25 is provided with a tongue 53 and that upper roller 51 is grooved to accommodate the said tongue. By this arrangement rolling support assembly 49 closely tracks main carriage rails 25 and 25a without side-slipping.

If desired, lower rollers 52 and 52a may be formed of or covered with a resilient material, such as rubber, or the like, to somewhat cushion the guidance of torch support bar 31 by rolling support assembly 49.

Those skilled in the art will be familiar with the modus operandi of contour reproducing cutting machines, hence a detailed discussion would serve no useful purpose. In brief summary, however, it might be said that where the machine is to cut a work piece according to the contours of a templet, the sole motive force for the entire machine is provided by the frictional engagement of the driven templet follower stub shafts 30 with the upstanding edges of the templet. Depending on the direction of movement of templet follower 29 along the templet edges, main carriage C will move along main frame rails 11 and 13, or tracer unit T will move along main carriage rails 25 and 25a, or in the case of compound motion, both the tracer unit and main carriage may move simultaneously. Since cutting torch P, through its supporting structure is operatively connected to both the tracer unit and the main carriage, motion transmitted to either of these two latter members will be further transmitted to the cutting torch supporting structure and ultimately to the cutting torch.

The machine of the present invention is also adapted to be operated without a templet for straight line cutting. To this end, the machine is provided with variable speed, reversible drive trains 54 and 55 best seen in FIG. 1. Drive train 54 controls the movement of main carriage C along main frame rails 11 and 13 while drive train 55 controls the movement of tracer unit T along main carriage rails 25 and 25a. If for instance, it is desired to cut a work piece into a plurality of strips running parallel to main frame members 10 and 12, the machine is operated through drive train 54; after each strip is cut, the torch can be indexed over by adjusting means already described. Similarly, if it is desired to cut a work piece into a plurality of strips running parallel to main carriage beams 18 and 18a, the machine is operated through drive train 55, with torch indexing being accomplished manually or through the intermittent use of drive train 54. When the machine is driven by one of these drive trains, the other is maintained in a locked position. When the machine is operated by the templet follower, both drive trains 54 and 55 are disengaged.

While the machine provided by this invention is particularly adapted for use at high speeds with plasma jet and laser torches, it will be understood that the machine is ideally suited for use at lower speeds with conventional oxygen torches.

I claim:

1. A shape cutting machine comprising:
   (A) a main carriage;
   (B) a tracer unit mounted for movement along said main carriage;
   (C) an elongated, rigid cutting tool support bar having a near end and a distal end;
   (D) a universal joint connecting the near end of said cutting tool support bar to said tracer unit;
   (E) means rigidly secured at the distal end of said cutting tool support bar, supporting same at two points for movement along said main carriage; and
   (F) at least one cutting tool mounted intermediate the ends of said cutting tool support bar.

2. A shape cutting machine comprising:
   (A) a main carriage comprising a pair of parallel, spaced rails running substantially the entire length of said carriage;
   (B) a tracer unit having rollers engaging said rails for movement of said tracer unit along said main carriage;
   (C) an elongated, rigid cutting tool support bar having a near end and a distal end;
   (D) a universal joint connecting the near end of said cutting tool support bar to said tracer unit;
   (E) a rolling support assembly rigidly secured at the distal end of said cutting tool support bar, said assembly comprising a pair of rollers one engaging each of said main carriage rails for movement of said cutting tool support bar along said main carriage; and
   (F) at least one cutting tool rigidly mounted intermediate the ends of said cutting tool support bar, whereby said cutting tool support bar is provided with a stable 3-point suspension system in which one suspension point is located a considerable distance from the two remaining suspension points, with the cutting tool rigidly secured to the support bar at a position intermediate the distant suspension points.

3. A torch cutting machine comprising:
   (A) a main carriage;
   (B) tracer unit mounted for movement along said main carriage;
   (C) torch support means comprising
      (1) an elongated, rigid torch holding bar having a near end and a distal end, and
      (2) torch holding bar adjusting means engaging the near end of said torch holding bar;
   (D) a universal joint connecting said torch holding bar adjusting means to said tracer unit;
   (E) means rigidly secured at the distal end of said torch holding bar, supporting same at two points for movement along said main carriage, and
   (F) at least one cutting torch mounted intermediate the ends of said torch holding bar.

4. A torch cutting machine comprising:
   (A) a main frame comprising a pair of spaced, parallel, horizontally disposed rails;
   (B) a main carriage mounted for movement along said main frame rails, comprising a pair of spaced, parallel rails disposed transversely of said main frame rails;
   (C) a tracer unit mounted for movement along said main carriage rails, and with said main carriage along said main frame rails;
   (D) an elongated, rigid torch support bar having a near end and a distal end;
   (E) a universal joint connecting the near end of said torch support bar to said tracer unit;
   (F) means rigidly secured at the distal end of said torch support bar, supporting same for movement along said main carriage, comprising
      (1) a bracket extending transversely of said main carriage rails, and
      (2) an upper and a lower roller mounted on each end of said bracket, engaging an upper surface of a main carriage rail; and
   (G) at least one cutting torch rigidly mounted intermediate the ends of said torch support bar, whereby said torch support bar is provided with a 3-point suspension system in which one suspension point is located a considerable distance from the two remaining suspension points, with the cutting torch rigidly secured to the support bar at a position intermediate the distant suspension points.

5. A torch cutting machine comprising:
   (A) a main carriage,
   (B) a tracer unit mounted for movement along said main-carriage;
   (C) torch support means comprising
      (1) an elongated, rigid torch holding bar having a near end and a distal end,
      (2) a rack on said torch holding bar extending from the near end thereof along a portion of the said bar's length, and
      (3) torch holding bar adjusting means comprising
         (a) a housing embracing the near end of said torch holding bar,
         (b) a gear disposed within said housing enmeshing the rack on said torch holding bar,
         (c) a gear retaining block mounted within said housing, and
         (d) means mounting said gear to said retaining block;
   (D) a ball and socket joint connecting said gear retaining block to said tracer unit;

(E) means rigidly secured at the distal end of said torch holding bar, supporting same at two points for movement along said main carriage.

6. The machine defined in claim 5 which additionally includes:
(F) a scale extending along a portion of said torch holding bar, closer to its near end;
(G) a window in the housing of said torch holding bar adjusting means, positioned so as to expose a portion of said scale therethrough; and
(H) a guide line on said housing adjacent said window.

References Cited by the Examiner

UNITED STATES PATENTS

| 1,777,497 | 10/30 | Krebs | 266—23 |
| 2,096,557 | 10/37 | Peo | 287—85 |
| 2,207,787 | 7/40 | Eberle | 266—23 |
| 3,016,804 | 1/62 | Zankl et al. | 266—23 X |

MORRIS O. WOLK, *Primary Examiner.*

JAMES H. TAYMAN, Jr., *Examiner.*